United States Patent [19]

Hofler et al.

[11] Patent Number: 4,958,072
[45] Date of Patent: Sep. 18, 1990

[54] REMOTE FIBER OPTIC ANGULAR-ORIENTATION SENSOR USING PHASE DETECTION OF TWO ORTHOGONAL OSCILLATING POLARIZATION VECTORS

[75] Inventors: Thomas Hofler, Monterey; Michael R. Brininstool, San Diego, both of Calif.; Jeffrey T. Newmaster, Portsmouth, R.I.; Steven L. Garrett, Pebble Beach, Calif.

[73] Assignee: The United States of America as represented by the Secretary of the Navy, Washington, D.C.

[21] Appl. No.: 241,534

[22] Filed: Sep. 7, 1988

[51] Int. Cl.$^5$ .......................... G01C 17/26; G02F 1/01
[52] U.S. Cl. .............................. 250/231.13; 33/363 K; 250/227.12; 250/225; 341/14
[58] Field of Search .................. 250/231 SE, 225, 227, 250/231.13, 231.16, 227.12; 33/363 K; 341/13, 14; 356/375

[56] References Cited

U.S. PATENT DOCUMENTS 4,577,414 3/1986 Migliori et al. ................... 33/363 K
4,650,996 3/1987 Maehara et al. ............... 250/231 SE

OTHER PUBLICATIONS

J. T. Newmaster et al., "Remote Fiber Optic Sensors for Angular Orientation"; Fiber Optic and Laser Sensors V. Proceedings of SPEI-The Int'l Soc. for Opt. Eng.; vol. 838; Mar. 1988.
J. T. Newmaster et al., "Channel Reduction Schemes for Fiber-Optic Angle Encoders"; Fiber and Integrated Optics, vol. 7; pp. 115-137; Mar. 1988.
J. L. Maida, Jr. et al.; "Fiber Optic Rotary Position Sensor"; Fiber Optic and Laser Sensors V. SPIE vol. 838; Mar. 1988.
Varshneya, "Applications of Time and Wavelength Division Multiplexing to Digital Optical Code Plates"; Fiber Optic and Laser Sensors V. SPIE vol. 838; pp. 210-213; Mar. 1988.

*Primary Examiner*—Edward P. Westin
*Attorney, Agent, or Firm*—Harvey Fendelman; Thomas Glenn Keough; Michael A. Kagan

[57] ABSTRACT

A method for remotely detecting the angular position of a rotatable code wheel is provided by generating two sine wave modulated light beams which are orthogonally polarized with respect to each other. The beams are combined and then directed through a polarization filter mounted on the code wheel. The combined beam incurs a phase shift with respect to a reference signal which depends upon the position of the code wheel. The combined polarized beam provides angular position resolution between zero and ninety degrees, but lacks quadrant resolution. Two other light beams are directed to a two channel digital mask pattern imprinted on the code wheel. The mask pattern encodes these latter beams with "on" or "off" pulses to provide quadrant resolution. The beams are converted to digital electric signals which are received by a programmable read oly memory (PROM). The PROM provides an output corresponding to the angular position of the code wheel to a display.

26 Claims, 4 Drawing Sheets

REMOTE FIBER OPTIC ANGULAR-ORIENTATION SENSOR USING PHASE DETECTION OF TWO ORTHOGONAL OSCILLATING POLARIZATION VECTORS

STATEMENT OF GOVERNMENT INTEREST

The invention described herein may be manufactured and used by or for the Government of the United States of America for governmental purposes without the payment of any royalties thereon or therefor.

RELATED APPLICATIONS

This case relates to a copending application entitled "FIBER OPTIC ANGULAR ORIENTATION SENSOR USING DIGITAL SERIAL ENCODING" by Steven L. Garrett, et al., U.S. Navy Case No. 71,263, U.S. Patent and Trademark Office Ser. No. 230,547, filed Aug. 8, 1988.

BACKGROUND OF THE INVENTION

The invention described herein is generally related to angular orientation sensors. More particularly, this invention relates to remote angular orientation sensors using phase polarized oscillating light beams.

Many applications require an angular orientation position sensor which can be read from a distant location. Such applications include industrial process controls and remotely piloted vehicles. Monitoring the angular position of a tool is necessary in many robotic system applications.

One type of remote angle sensor that utilizes polarized optical signals to convey information regarding angular position is described by Migliori, et al in U.S. Pat. No. 4,577,414. In that device, a light beam is split into two inner channel beams and two outer channel beams. The inner channel beams pass through fixed linear polarization filters that are aligned orthogonally to each other. The polarized inner channel beams then pass through a linear polarization filter mounted on a rotatable wheel. The two outer channel beams are directed to fall incident upon concentric semicircular masks printed on the code wheel.

Analog amplitude information is encoded onto the two inner channel beams as the linearly polarized light beams pass through the polarization filter on the code wheel. The only light transmitted through the polarizing filter on the code wheel is linearly polarized at an angle $\Theta$ with respect to the angle of the code wheel polarization filter ($\pm 180$ degrees). The intensity of the beam transmitted through the polarization filter is proportional to $\sin^2\Theta$ and $\cos^2\Theta$ due to orthogonal orientation of the fixed filters. Letting $\underline{A}$ equal the intensity of the beam proportional to $I_0\sin^2\overline{\Theta}$ and $\underline{B}$ equal the intensity of the beam proportional to $I_0\cos^2\Theta$ where $I_0$ equals the maximum intensity of the beams, the ratio of $\underline{A}$ to $\underline{B}$ is equal to Therefore:

$$\Theta = \tan^{-1}[(A/B]^{\frac{1}{2}}$$

Because both channels are energized by a single light source, fluctuations in source intensity are eliminated when the ratio A/B is formed. Since light intensity is always a positive quantity, $\Theta$ is always between 0 and 90 degrees. Normalization of the two inner channel intensities is necessary due to differences in the peak intensities of the channels caused by differences in separation between the inner channels, optical path lengths, coupling losses, and electrical component characteristics of these channels. Thus, the Migliori device requires circuitry to store, compare, and update the differences in signal intensities for both inner, analog channels. Equation (1) assumes both analog inner channels have the same maximum and minimum values. To compensate for the difference in maximum beam intensity between the two analog channels, Migliori modifies Equation (1) so that:

$$\Theta = \tan^{-1}[(A.B_{max}/B.B_{max})^{\frac{1}{2}}] \quad (2)$$

Using the trigonometric identity the angle, $\Theta$, can also be determined from:

$$\cos 2\Theta = A/A_{max}31 \ B/BHd \ max$$

or:

$$\Theta = (\frac{1}{2})\cos^{-1}[A/A_{max} - B/B\max] \quad (3)$$

The two outer channels of the Migliori device provide quadrant ambiguity and are encoded with either "on" or "off" pulses depending on the position of the masks on the code wheel relative to the incident outer channel beams. This encoding provides information necessary to determine the position of the code wheel within a quadrant, i.e., 0-90 degrees, 90-180 degrees, 180-270 degrees, or 270-360 degrees.

All four channel beams leave the sensor and are each propagated through separate optical fibers to detector circuitry so that the encoded beams can be processed to provide an output directly in degrees or radians.

Thus, a need exists for a remote angular orientation sensor that does not compare light signal intensities. If light signal intensity comparison can be eliminated, the need for intensity normalization is obviated and detector circuit complexity and accompanying costs can be reduced.

SUMMARY OF THE INVENTION

The present invention avoids the limitations of remotely readable angular orientation sensors that compare and normalize light signal intensities. The present invention detects angular position by comparing a phase shift of two orthogonally polarized beams with respect to a reference signal after the polarized beams are combined and pass through a polarization filter mounted on a rotatable code wheel. This scheme provides remote angle sensing based on phase detection with fewer components and at lesser expense than conventional remote angle sensors, thus avoiding the use of hardware that store, compare, and update differences in signal intensities.

In the present invention a function generator drives a broadband light source with a reference signal. The light source outputs a broadband light beam to a wavelength division demultiplexer which separates the beam into three separate light beams, each having different center wavelengths. Two beams are directed to a two channel digital mask pattern imprinted on a rotatable code wheel. These two beams are digitally encoded with "on" or "off" pulses corresponding to the position of code wheel and provide quadrant resolution. The third beam output from the demultiplexer is further separated into two light beams having a phase lag with respect to one another. These latter two beams each pass through stationary polarization filters having polarization axes orthogonal to one another. The two polarized light beams are combined by a beam splitter and then are directed through a polarization filter mounted on the code wheel. The code wheel is fixedly mounted to a shaft that rotates within an encoder body. The waveform of the emerging beam is subject to a phase shift with respect to the reference signal, the value of which depends upon the angular position of the code wheel.

The two digitally encoded beams and the combined polarized beam are each received by separate graded refractive index rod lenses. The beams then propagate into an optical directional coupler which multiplexes them into a composite beam. The composite beam propagates through an optical link fiber to remote detection circuitry where the composite beam is demultiplexed back into the two digitally encoded light beams and the combined polarized light beam. The two digitally encoded light beams are each directed to separate optical receivers which provide electrical signal outputs having waveforms corresponding to the waveforms of the digitally encoded light signals. The combined polarized signal is directed to a lock-in amplifier which also receives the reference signal used to drive the broadband light source. The lock-in amplifier provides an analog electrical signal output corresponding to the phase difference between the reference signal and the combined polarized beam. The output of the lock-in amplifier is converted to a digital signal by an analog-to-digital converter.

A programmable read only memory (PROM) receives the outputs from the analog-to-digital converter and the optical receivers. These outputs correspond to a memory address in the PROM. The PROM contains a look-up table where each address stores a number corresponding to a specific angular position of the code wheel. The PROM provides an output to a digital display which presents the position of the code wheel in legible format which may be in either radians or degrees.

A second embodiment of the present invention provides a remote compass heading sensor. A magnet mounted to the shaft maintains constant alignment of the code wheel as the encoder body changes angular position with respect to the earth's magnetic field.

OBJECTS OF THE INVENTION

An object of the present invention is to provide an angle sensor that can remotely detect angular position.

A second object of the invention is to provide a remote angular position sensor wherein angular position is detected by light beams.

A third object of the invention is to provide a remote angular position sensor wherein angular position is determined by a phase difference between a reference signal and a polarized light beam.

A fourth object of the present invention is to provide a remote compass heading sensor.

DESCRIPTION OF THE PREFERRED EMBODIMENT

Figure 1:
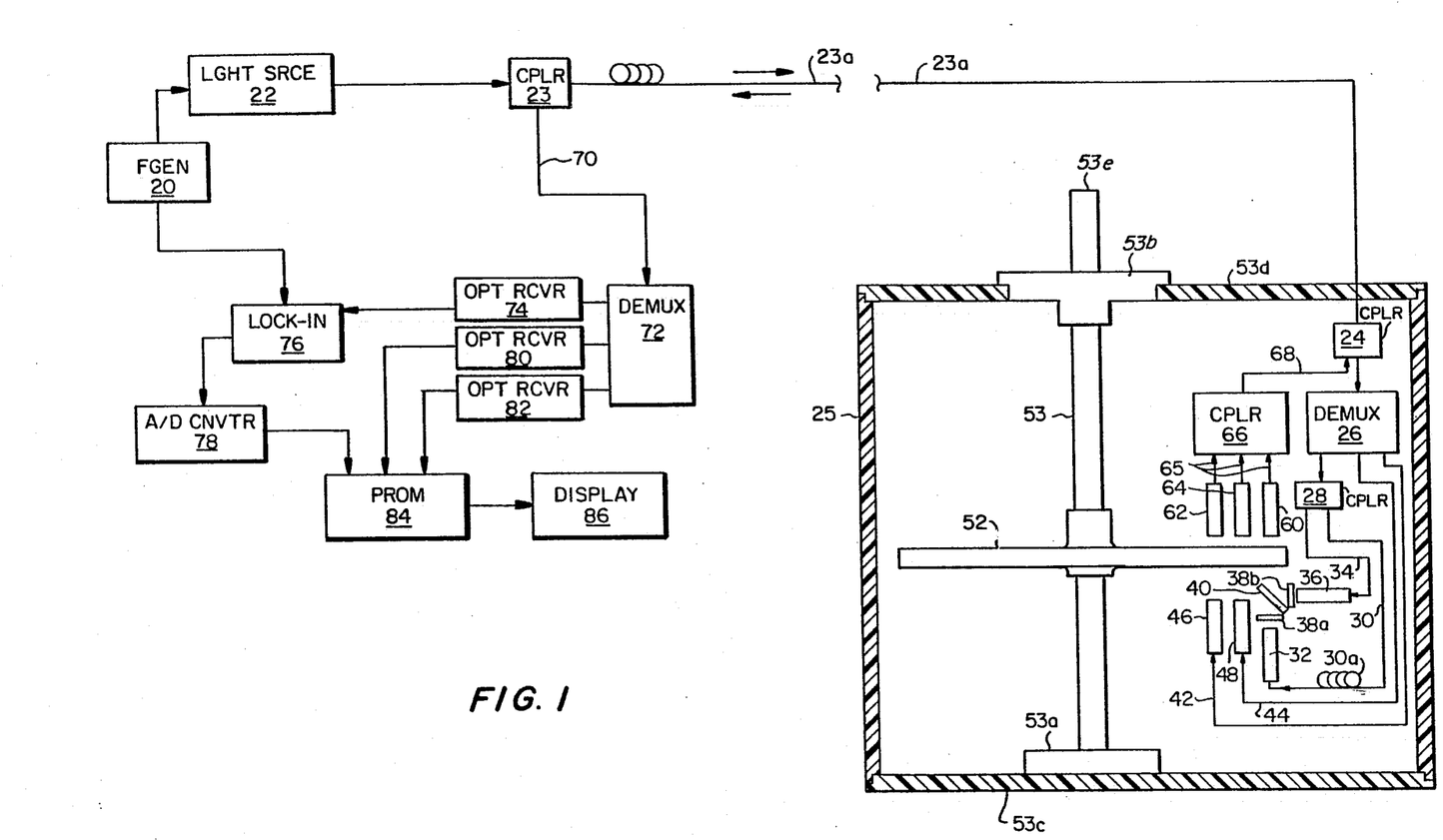
FIG. 1 is a schematic diagram of the optical-electrical circuit of the present invention and a sectional view through the encoder body.

In the present invention, illustrated in FIG. 1, function generator 20 provides a sine wave modulated input to broadband light source 22. The output of broadband light source 22 is a sine wave modulated broadband light beam which is directed to optical directional coupler 23. The broadband light beam propagates from coupler 23 via optical link fiber 23a to optical directional coupler 24 mounted in encoder body 25. Wavelength division demultiplexer 26 receives the broadband light beam from coupler 24 and separates it into three separate, sine wave modulated light beams having different center wavelengths, $\alpha_1$, $\alpha_2$, and $\alpha_3$.

The $\alpha_1$ beam is input to optical directional coupler 28 which separates the $\alpha_1$ beam into two separate, equal signals, $\alpha_4$ and $\alpha_5$. The $\alpha_4$ beam propagates from optical directional coupler 28 through optical fiber 30 connected in series with optical delay line 30a to one-quarter pitch graded refractive index rod lens 32. The $\alpha_5$ beam propagates through optical fiber 34 to one-quarter pitch graded refractive index rod lens 36. Lenses 32 and 36 are positioned so that the beams emitted therefrom are directed to fixed polarization filters 38a and 38b. Filters 38a and 38b have polarization axes positioned orthogonal with respect to one another. Beam splitter 40 is positioned to receive the polarized $\alpha_4$ and $\alpha_5$ beams emitted from lenses 38a and 38b and combines them into a composite polarized beam, $\alpha_6$. The $\alpha_2$ and $\alpha_3$ beams propagate through optical fibers 42 and 44, respectively to one-quarter pitch graded refractive index rod lenses 46 and 48.

Figure 2:
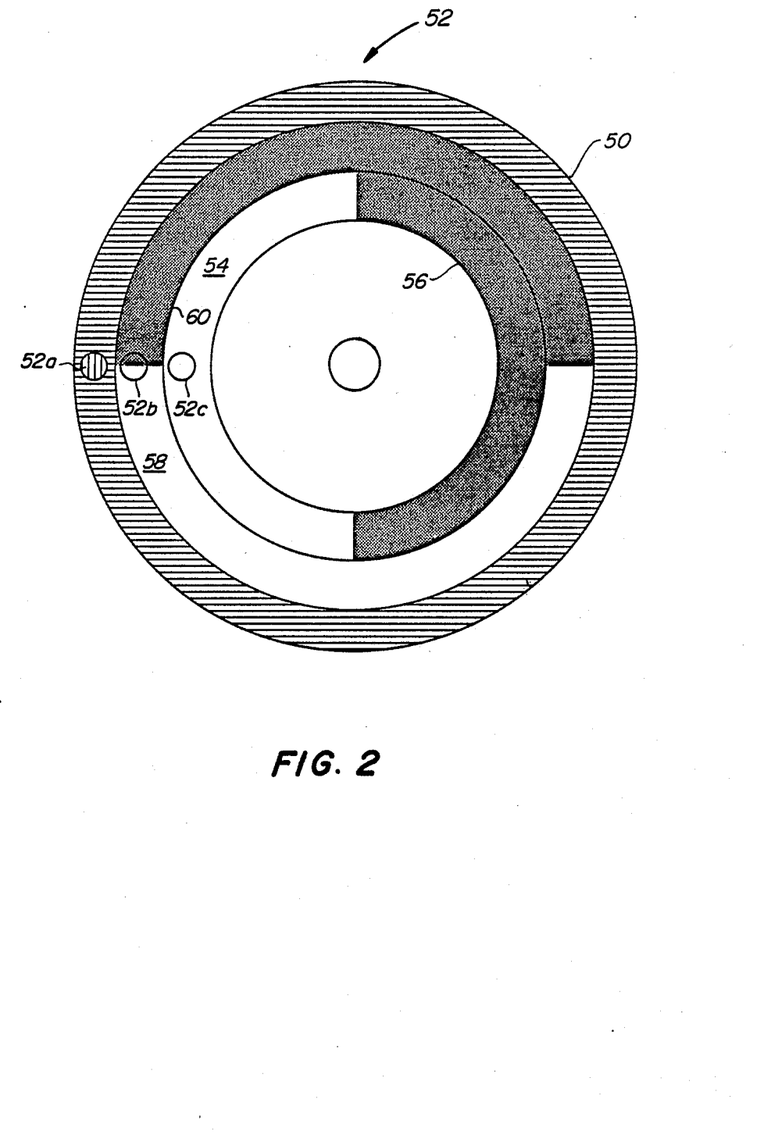
FIG. 2 is a plan view of the code wheel illustrated in FIG. 1.

Referring to FIGS. 1 and 2, the $\alpha_6$ beam emitted from beam splitter 40 is directed so that it is transmitted through fixedly projected area 52a that transects rotatable polarization filter 50 mounted to code wheel 52. The $\alpha_2$ and $\alpha_3$ beams emitted from lenses 46 and 48 are directed so that they interrogate a two channel mask pattern through fixedly projected areas 52c and 52b, respectively, that transect code wheel 52. The first channel of the mask pattern is a ring shaped area consisting of 180 degree semicircular transparent area 54 and 180 degree semicircular opaque area 56. The second channel is a ring shaped area consisting of a 180 degree semicircular transparent area 58 and a 180 degree semicircular opaque area 60. The patterns formed by channels one and two are off-set by 90 degrees.

Referring to FIG. 1, code wheel 52 is fixedly mounted to shaft 53. Shaft 53 freely rotates in bearings 53a and 53b. Bearing 53a is mounted to base 53c. Bearing 53b is mounted to cap 53d. Base 53c and cap 53d are mounted to encoder body 25 by suitable means as would be readily understood by persons skilled in this art. End 53e of shaft 53 extends through cap 53d and may be coupled to an external rotating body by suitable means as would be readily understood by persons skilled in this art.

Still referring to FIGS. 1 and 2, one-quarter pitch graded refractive index lens 60 is positioned adjacent to polarization filter 50 of code wheel 52 so that lens 60 receives the $\alpha_6$ beam directed from beam splitter 40 through filter 50. One-quarter pitch graded refractive index rod lenses 62 and 64 are positioned adjacent to code wheel 52 so that they receive the $\alpha_2$ and $\alpha_3$ beams that pass through channels one and two of the mask pattern. Encoder body 25 may be filled with a fluid (not shown) having an index of refraction matching that of lenses 32, 48, 46, 60, 62, and 64 to reduce Fresnel losses.

The beams received by lenses 60, 62 and 64 are propagated by optical fibers 65 to optical directional coupler 66 which multiplexes them into a composite light beam. The composite beam is propagated via optical fiber 68 to optical directional coupler 24 which directs the composite beam through optical link fiber 23a to coupler 23. The composite beam propagates from coupler 23 through optical fiber 70 to wavelength division demultiplexer 72 which separates the composite beam back into its three component constituent beams, $\alpha_6$, $\alpha_2$, and $\alpha_3$. Optical receiver 74 receives the $\alpha_6$ beam from demultiplexer 72. The output of receiver 74 is an electrical signal having a waveform corresponding to that of the $\alpha_6$ beam and is provided to lock-in amplifier 76. A lock-in amplifier configured in the form of an integrated circuit, suitable for use in the present invention, is Model No. AD 640 manufactured by Analog Devices. Amplifier 76 receives the reference signal from function generator 20 and compares it to output of receiver 74. Lock-in amplifier 76 provides an output which is an electrical signal that represents the phase difference between the inputs to lock-in amplifier 76. This phase difference represents the angular position of code wheel 52. Analog to digital converter 78 receives the analog output of lock-in amplifier 76 and transforms it into a digital output.

Optical receivers 80 and 82 receive the $\alpha_2$ and $\alpha_3$ beams from demultiplexer 72 and provide electrical signal outputs having waveforms corresponding to those of the $\alpha_2$ and $\alpha_3$ beams to programmable read only memory (PROM) 84. PROM 84 also receives the output of converter 78. PROM 84 may, for example, have a 10 bit memory. A suitable PROM is Model No. $\mu$ PB 429 2,048 $\times$ 8-Bit Bipolar TTL PROM manufactured by NEC Electronics Corporation. The inputs to PROM 84 correspond to a memory address in PROM 84. PROM 84 is programmed with a "look-up" table where each address stores a number corresponding to a specific angular position of code wheel 52. Each number stored in an address of PROM 84 is a solution to the equation $$\Omega = \tan^{-1}[-\tan^2\Theta] \quad \text{(4) which is derived from the general equation:}$$

$$\Omega = \tan^{-1}[-\tan^2\Theta] \quad \text{(4) and includes quadrant resolution provided by the } \alpha_2 \text{ and } \alpha_3 \text{ beams; where:}$$

$\Omega$ = the phase difference between the combined polarized beam, $\alpha_6$, and the reference signal provided by function generator 20
B = the magnitude of the ac component of the $\alpha_4$ beam
D = the magnitude of the ac component of the $\alpha_5$ beam
$\Theta$ = the angle of the polarization axis of polarization filter 50
$\phi$ = the time delay induced phase lag between the $\alpha_4$ and $\alpha_5$ beams.

PROM 84 is programmed in accordance with well known techniques as would be readily understood by those skilled in this art.

The output of PROM 84 is input to display 86 which presents the position of code wheel 52 in legible format which may be in either degrees or radians.

Demultiplexers 26 and 72 may be Model WDM STD 500, manufactured by PTR Optics. Alternatively, it is within the scope of the present invention to calculate $\Omega$ from equation (4) by use of an arithmetic processor which receives the outputs of converter 78 and optical receivers 80 and 82 in accordance with well known techniques as would be readily understood by those skilled in this art.

Figure 4:
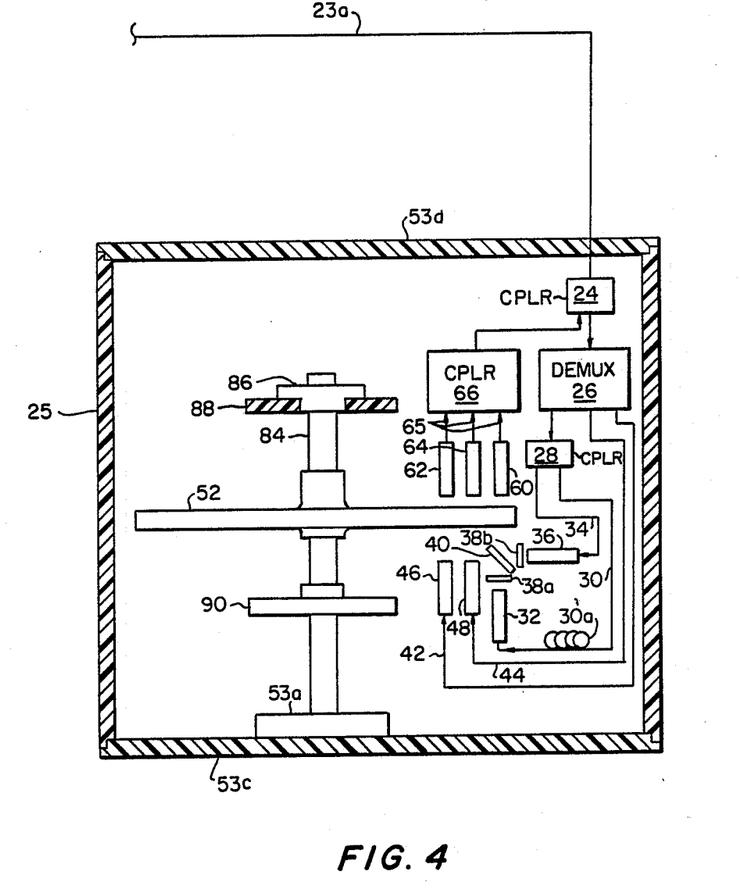
FIG. 4 is a sectional view through the encoder body that is modified to serve as a remote compass heading sensor.

A second embodiment of the present invention modified to serve as a remote compass heading sensor is depicted in FIG. 4. In this embodiment, optical link fiber 23a is operably coupled to optical directional coupler 23 (not shown), depicted in FIG. 1. Code wheel 52 is fixedly attached to shaft 84. Shaft 84 is freely rotatable within support bearings 53a and 86. Bearing 53a is mounted to base 53c. Bearing 86 is mounted to bearing support 88, attached to the sides of encoder body 25. Magnet 90 is fixedly attached to shaft 84 so that it and code wheel 52 may rotate in unison. As the heading of encoder body 25 changes, magnet 90 maintains constant alignment of code wheel 52 with respect to the earth's magnetic field. The relative motion of encoder body 25 with respect to code wheel 52 encodes the $\alpha_6$, $\alpha_2$, and $\alpha_3$ beams with information that is subsequently converted to a compass heading in the identical manner that the information encoded in these beams is converted to an angular position of code wheel 52 as previously described herein.

The invention operates as follows: Referring to FIG. 1, function generator 20 provides a sine wave modulated reference signal with a dc componenet at a frequency, w, to broadband light source 22. Light source 22 generates a broadband light beam which is propagated via optical link fiber 23a to demultiplexer 26. The broadband light beam is sine wave modulated and has a waveform corresponding to the waveform of the reference signal. Demultiplexer 26 separates the broadband light source into three separate light beams, each having distinct center wavelengths, $\alpha_l$, $\alpha_2$, and $\alpha_3$.

The $\alpha_1$ beam is received by optical directional coupler 28 which separates the $\alpha_1$ beam into two separate, equal beams, $\alpha_4$ and $\alpha_5$, also modulated at angular frequency, w. The waveform of the $\alpha_4$ beam can be expressed as A+Bsin(wt) where A is the magnitude of the dc component and B is the magnitude of the ac component. The waveform of the $\alpha_5$ beam can be expressed as C+Dsin(wt+$\phi$) where C is the magnitude of the dc component, D is the magnitude of the ac component, and $\phi$ is the phase difference between beams induced by delay line 30a.

The $\alpha_4$ beam is propagated through optical fiber 30 and delay line 30a to graded refractive index rod lense 32. The $\alpha_5$ beam propagates through optical fiber 34 to graded refractive index rod lense 36. The $\alpha_4$ and $\alpha_5$ beams are separately emitted from lenses 32 and 36 and then are separately directed through polarization filters 38a and 38b. Beam splitter 40 receives the $\alpha_4$ and $\alpha_5$ beams and combines them into a combined polarized beam, $\alpha_6$. The $\alpha_6$ beam behaves as though it were two separate beams, $\alpha_4$ and $\alpha_5$, sharing the same space. The polarization axes of filters 38a and 38b are orthogonal to one another so that the $\alpha_6$ beam acts like a polarization vector oscillating back and forth within a 90 degree quadrant. The frequency of modulation, w, of the $\alpha_4$, $\alpha_5$, and $\alpha_6$ beams is established by function generator 20.

Beam splitter 40 directs the $\alpha_6$ beam through polarization filter 50. The interaction of filter 50 on the $\alpha_6$ beam produces a temporal phase shift in this beam with respect to the reference signal. The phase shift is dependent upon the angular position, $\Theta$, of code wheel 52. The intensity of one polarized component of the $\alpha_6$ beam is proportional to $\sin^2\Theta$ and the other is proportional to $\cos_2\Theta$. The angle, $\Theta$, is the angular position of code wheel 52. Neglecting finite extinction and attenuation affects of filters 38a,38b, and 50, the resulting detected light intensity signal, $\Phi$, can be expressed as:

$$\Phi = (A + B\sin(wt))\cos^2\Theta + (C + D\sin(wt+\phi))\sin^2\Theta$$

For phase determination the ac portions of the signal can be separated and the dc portions of beam $\alpha_6$ ignored. This procedure provides, via conventional trigonometric identities:

$$\Phi_{ac} = B\sin(wt)\cos^2\Theta + D\sin(wt+\phi)\sin^2\Theta$$

and $$\Phi_{ac} = B\sin(wt)\cos^2\Theta + D[\sin(wt)\cos\phi + \cos(wt)\sin\phi]\sin^2\Theta$$

Determining the first zero crossing of equation (8) ($\Phi_{ac}=0$) for phase determination, referencing it to a fixed time, such that the equation $wt = \Omega$ equals a constant, and collecting like terms yields:

$$0 = [B\cos^2\Theta + D\sin^2\Theta\cos\phi]\sin\Omega + D\sin^2\Theta\sin\phi\cos\Omega$$

so that:

$$\tan\Omega = [-D\sin^2\Theta\sin\phi]/[B\cos^2\Theta + D\sin^2\Theta\cos\phi]$$

The phase angle of the $\alpha_6$ beam with respect to the reference signal then is given by:

$$\Omega = \tan^{-1}[(-D\tan^{2\Theta\sin\phi})/(B + D\tan^{2\Theta\cos\phi})]$$

Setting $D=B$ and $\phi=90$ degrees simplifies equation 11 so that $\Omega = \tan^{31\ 1}[-\tan^2\Theta]$. The phase difference, 106, is determined by the invention as is described below.

Figure 3:
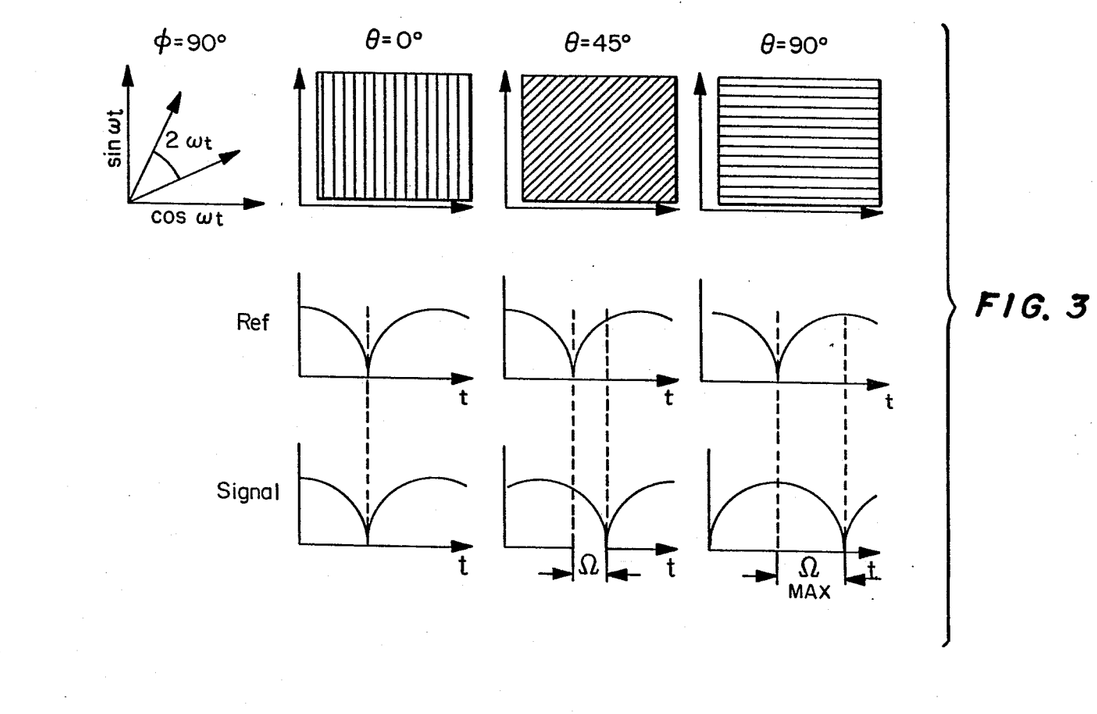
FIG. 3 depicts a set of diagrams illustrating the phase relationship between the reference signal and the combined polarized beam after interaction with the code wheel for various positions of the code wheel.

Operation of the invention is graphically depicted in FIG. 3 where: w is the modulation frequency; $\phi$ is the phase difference between the orthoganally polarized beams, $\alpha_4$ and $\alpha_5$; $\Theta$ is the angular position of code wheel 52; "Ref" is the reference signal provided by function generator 20 "Signal" represents the waveform of the combined polarized beam, $\alpha_6$ after passing through polarization filter 50; $\Omega$ is the phase difference between the output of receiver 74, which has a waveform analagous to that of the $\alpha_6$ beam, and the reference signal; and t represents time.

Referring to FIGS. 1 and 2, the $\alpha_2$ and $\alpha_3$ beams are emitted from lenses 46 and 48 so that they interrogate a two channel mask pattern at projected areas 52c and 52b that transect code wheel 52. Interaction of the $\alpha_2$ and $\alpha_3$ beams with code wheel 52 causes these beams to be encoded with "on" or "off" pulses that provide quadrant resolution of the position of code wheel 52.

After passing through code wheel 52, the $\alpha_6$, $\alpha_2$, and $\alpha_3$ beams are separately received by lenses 62, 64, and 60 and are propagated to optical directional coupler 66 which multiplexes the three beams into a single composite beam. The composite beam propagates through optical link fiber 23a and optical fiber 70 to demultiplexer 72 which separates it back into the $\alpha_6$, $\alpha_2$, and $\alpha_3$ beams by wavelength division demultiplexing.

Optical receiver 74 receives the $\alpha_6$ beam from demultiplexer 74 and produces an electrical output signal having a waveform corresponding to that of the $\alpha_6$ beam. Lock-in amplifier 76 receives the reference signal from function generator 20 and the output of optical receiver 74. Lock-in amplifier 76 provides an analog electrical signal output which represents the phase difference between the reference signal and the $\alpha_6$ beam caused by interaction of that beam with filter 50. This analog signal is received by analog-to-digital converter 78 which converts it to a digital signal.

Optical receivers 80 and 82 separately receive the $\alpha_2$ and $\alpha_3$ beams from demultiplexer 72 and provide digital electrical signal outputs having waveforms corresponding to those of these beams.

PROM 84 receives the outputs of converter 78 and optical receivers 80 and 82 which together represent a memory address location in PROM 84. PROM 84 outputs a signal from an address location corresponding to a specific solution of equation 11 that represents the angular position of code wheel 52. This output then is provided to display 86.

Obviously, many modifications of the present invention are possible in light of the above teachings. It is therefore to be understood that within the scope of the appended claims, the invention may be practiced otherwise than as specifically described.

What is claimed:

1. A sensor for remotely detecting an angular position of a rotatable code wheel comprising:
   first means for generating first and second modulated polarized light beams each having a first center wavelength, said first light beam being polarized orthogonally to said second sight beam, said first light beam having a phase lag with respect to said second light beam, and for combining said first and second light beams into a composite polarized light beam;
   second means positioned proximate to said first means for receiving said composite polarized light beam;
   a code wheel rotatable about an axis, said code wheel having a first polarization filter, said code wheel interposed between said first means and said second means so that said composite polarized light beam is transmitted through said polarization filter; and
   third means operably connected to said second means for providing an output corresponding to said angular position of said code wheel by comparing a phase relationship between said composite polarized light beam and a reference signal.

2. The sensor of claim 1 wherein:
   said code wheel has first and second channel mask patterns to provide quadrant resolution of the position of said code wheel; and
   said first means further includes:
   means for generating third and fourth light beams, said third light beam having a second center wavelength different than said first center wavelength, said fourth light beam having a third center wavelength different than said first and second center wavelengths, said first means further being positioned for directing said third and fourth light beams incident upon said first and second channel mask patterns, respectively;

fourth means positioned proximate to said code wheel for receiving said third and fourth light beams, said fourth means being operably coupled to said third means.

3. The sensor of claim 2 wherein said first means includes:

a broadband light source for generating a modulated broadband light beam;

a function generator operably coupled to said broadband light source, said function generator providing said reference signal;

a first demultiplexer operably coupled to receive said broadband light beam, said demultiplexer separating said broadband light beam into said third and fourth light beams, and into a fifth light beam, said third, fourth, and fifth light beams having second, third, and first center wavelengths, respectively;

a first optical directional coupler operably connected to receive fifth light beam, said optical directional coupler separating said fifth light beam into sixth and seventh light beams;

first and second graded refractive index lenses optically coupled to receive said third and fourth light beams from said first demultiplexer, said first and second lenses positioned to direct said third and fourth light beams incident upon said first and second channel mask patterns respectively;

third and fourth graded refractive index lenses operably coupled to receive said sixth and seventh light beams;

second and third polarization filters each having a polarization axis, said filters being optically aligned in the paths of said sixth and seventh light beams, said axis of said second filter being orthogonal to said axis of said third polarization filter, said sixth and seventh light beams being transformed into said first and second light beams after being transmitted through said second and third polarization filters;

an optical delay line operably coupled in series between said optical directional coupler and said fourth lens, said optical delay line inducing a phase lag into said seventh light beam relative to said sixth light beam; and a beam splitter optically aligned to receive said first and second light beams from said second and third polarization filters and for combining said first and second light beams into said composite polarized light beam.

4. The senor of claim 3 wherein:

said function generator effectuates a sine wave modulated output from said broadband light source.

5. The sensor of claim 4 wherein:

said second means includes:

a fifth graded refractive index rod lens positioned substantially adjacent to said code wheel for receiving said composite polarized light beam;

said fourth means includes:

sixth and seventh graded refractive index rod lenses positioned substantially adjacent to said code wheel for receiving said third and fourth light beams;

a second optical directional coupler optically coupled to said fifth, sixth and seventh lenses, said second optical directional coupler combining said composite polarized light beam, and said third and fourth light beam sinto a composite encoded light beam;

said third means includes:

a second demultiplexer optically coupled to receive said composite encoded light beam, said second demultiplexer separating said composite encoded light beam into said composite polarized light beam and into said third and fourth light beams;

a first optical received operably coupled to said second demultiplexer to receive said composite polarized light beam, said first receiver providing a first electrical signal having a waveform corresponding to said waveform of said composite polarized light beam; and second and third optical receivers operably coupled to said second demultiplexer to received said third and fourth light beams, respectively, said second and third optical receivers providing second and third electrical signals having waveforms corresponding to said waveforms of said third and fourth light beams, respectively;

a lock-in amplifier having first and second inputs and an output, said first input operably coupled to receive said first electrical signal, said second input operably coupled to receive said reference signal;

an analog-to-digital convertor operably coupled to said output of said lock-in amplifier;

a programmable read only memory (PROM) having first, second, and third inputs, and an output, said first input operably coupled to said analog-to-digital convertor, said second input operably coupled to receive said second electrical signal, said third input operably coupled to receive said third electrical signal, said PROM providing an output corresponding to an angular position of said code wheel.

6. The sensor of claim 5 which further includes:

a display operably coupled to receive said output of said PROM, said display providing said code wheel position in legible format.

7. A method for remotely detecting the angular position of a rotatable code wheel, comprising the steps of:

generating a first modulated light beam having a first center wavelength;

generating a second modulated light beam having said first center wavelength;

inducing a phase lag between said first and second light beams;

polarizing said first light beams;

polarizing said second light beam orthogonally to said first light beam;

combining said first and second light beams into a composite polarized light beam;

transmitting said composite polarized light beam through a polarization filter mounted to said code wheel to encode said beams with information corresponding to an angular position of said code wheel;

receiving said composite polarized light beam;

decoding said information contained within said composite polarized light beam; and providing an output corresponding to said position of said code wheel by comparing a phase relationship between said composite polarized light beam and a reference signal.

8. The method of claim 7 further comprising the step of:
displaying the position of said code wheel.

9. The method of claim 8 wherein said steps of generating said first and second modulated light beams includes:
sine wave modulating said first and second light beams.

10. The method of claim 9 further comprising the steps of:
generating a third light beam having a second center wavelength, said second center being different than said first center wavelength;
generating a fourth light beam having a third center wavelength, said third center wavelength being different than said first and second center wavelengths;
directing said third and fourth light beams incident upon a two channel mask pattern on said code wheel to encode said beams with information providing quadrant resolution of said position of said code wheel;
receiving said third and fourth light beams; and
decoding said information contained within said third and fourth light beams; and
providing an output corresponding to said position of said code wheel, said output including quadrant resolution.

11. The method of claim 10 wherein said step of inducing includes:
inducing a ninety degree phase lag between said first and second light beams.

12. The method of claim 11 wherein the step of displaying includes:
displaying the position of said code wheel with quadrant resolution.

13. The method of claim 12 wherein the step of comparing includes:
comparing a phase difference between said composite polarized light beam with an electrical reference signal.

14. A sensor for remotely detecting a compass heading, comprising:
an encoder body;
a shaft rotatably mounted to said encoder body;
first means for generating first and second modulated polarized light beams each having a first center wavelength, said first light beam being polarized orthogonally to said second light beam, said first light beam having a phase lag with respect to said second light beam, and for combining said first and second light beams into a composite polarized light beam:
second means positioned proximate to said first means for receiving said composite polarized light beam;
a code wheel mounted to said shaft, said code wheel having a polarization filter, said code wheel interposed between said first means and said second means so that said composite polarized light beam is transmitted through said polarization filter; and
third means operably connected to said second means for providing an output corresponding to said compass heading by comparing a phase relationship between said composite polarized light beam and a reference signal.

15. The sensor of claim 14 wherein:
said code wheel has first and second channel mask patterns found thereon to provide quadrant resolution of the position of said code wheel; and
said first means further includes:
means for generating third and fourth light beams, said third light beam having a second center wavelength different than said first center wavelength, said fourth light beam having a third center wavelength different than said first and second center wavelengths, said first means further being positioned for directing said third and fourth light beams incident upon said first and second channel mask patterns, respectively;
fourth means positioned proximate to said code wheel for receiving said third and fourth light beams, said fourth means being operably coupled to said third means.

16. The sensor of claim 15 wherein:
said first means includes:
a broadband light source for generating a modulated broadband light beam;
a function generator operably coupled to said broadband light source, said function generator providing said reference signal;
a first demultiplexer operably coupled to receive said broadband light beam, said demultiplexer separating said broadband light beam into said third and fourth light beams, and into a fifth light beam, said third, fourth, and fifth light beams having second, third, and first center wavelengths, respectively;
a first optical directional coupler operably connected to receive said fifth light beam, said optical directional coupler separating said fifth light beam into sixth and seventh light beams;
first and second graded refractive index lenses optically coupled to receive said third and fourth light beams from said first demultiplexer, said first and second lenses positioned to direct sand third and fourth light beams incident upon said first and second channel mask patterns, respectively;
third and fourth graded refractive index lenses operably coupled to receive said sixth and seventh light beams;
second and third polarization filters each having a polarization axis, said filters being optically aligned in the paths of said sixth and seventh light beams, said axis of said second filter being orthogonal to said axis of said third polarization filter, said sixth and seventh light beams being transformed into said first and second light beams after being transmitted through said second and third polarization filters;
an optical delay line operably coupled in series between said optical directional couler and said fourth lens, said optical delay line inducing a phase lag into said seventh light beam relative to said sixth light beam; and
a beam splitter optically aligned to receive said first and second light beams from said second and third polarization filters and for combining said first and second light beams into said composite polarized light beam.

17. The sensor of claim 16 wherein:
said broadband light beam generated by said broadband light source is sine wave modulated.

18. The sensor of claim 17 wherein:
said second means includes:

a fifth graded refractive index rod lens positioned substantially adjacent to said code wheel for receiving said composite polarized light beam;

said fourth means included:

sixth and seventh graded refractive index rod lenses positioned substantially adjacent to said code wheel for receiving said third and fourth light beams;

a second optical directional coupler optically coupled to said fifth, sixth and seventh lenses, said second optical directional coupler combining said composite polarized light beam, and said third and fourth light beams into a composite encoded light beam;

said third means includes:

a second demultiplexer optically coupled to receive said composite encoded light beam, said second demultiplexer separating said composite encoded light beam into said composite polarized light beam, and said third and fourth light beams;

a first optical receiver operably coupled to said second demultiplexer to receive said first composite polarized light beam, said first receiver providing a first electrical signal having a waveform corresponding to said waveform of said composite polarized light beam; and second and third optical receivers operably coupled to said second demultiplexer to receive said third and fourth light beams, respectively, said second and third optical receivers providing second and third electrical signals having waveforms corresponding to said waveform of said third and fourth light beams, respectively;

a lock-in amplifier having first and second inputs and an output, said second input operably coupled to receive said reference signal;

an analog-to-digital convertor operably coupled to said output of said lock-in amplifier; a programmable read only memory (PROM) having first, second, and third inputs, and an output, said first input operably coupled to said analog-to-digital convertor, said second input operably coupled to receive said second electrical signal, said third input operably coupled to receive said third electrical signal, said PROM providing an output corresponding to said compass heading.

19. The sensor of claim 18 which further includes:

a display operably coupled to receive said output of said PROM, said display providing said compass heading in legible format.

20. A method for remotely detecting a compass heading, comprising the steps of:

rotatably mounting a code wheel to a frame, said code wheel having a polarization filter;

magnetically aligning said code wheel with the earth's magnetic field;

generating a first modulated light beam having a first center wavelength;

generating a second modulated light beam having said first center wavelength;

inducing a phase lag between said first and second light beams;

polarizing said first light beam;

polarizing said second light beam orthogonal to said first light beam;

combining said first and second polarized light beams into a composite polarized light beam;

transmitting said composite polarized light beam through said polarization filter to encode said composite polarized light beam with information corresponding to said compass heading;

receiving said composite polarized light beam;

decoding said information contained within said composite polarized light beam; and providing an output corresponding to said compass heading by comparing a phase relationship between said composite polarized light beam and a reference signal.

21. The method of claim 20 further comprising the step of:

displaying said compass heading.

22. The method of claim 21 wherein said steps of generating said first and second modulated light beams include:

sine wave modulating said first and second light beams.

23. The method of claim 22 further comprising the steps:

generating a third light beam having a second center wavelength different than said first center wavelength;

generating a fourth light beam having a third center wavelength different than said first and second center wavelengths;

directing said third and fourth light beams incident upon a two-channel mask pattern on said code wheel to encode said beams with information providing quadrant resolution of said compass heading;

receiving said third and fourth light beams;

decoding said information contained within said third and fourth light beams; and providing an output corresponding to said compass heading, said output including quadrant resolution.

24. The method of claim 23 wherein the step of inducing includes:

inducing a ninety degree phase lag between said first and second light beams.

25. The method of claim 24 wherein the step of displaying includes:

displaying said compass heading with quadrant resolution.

26. The method of claim 25 wherein the step of comparing includes:

comparing a phase difference between said composite polarized light beam with an electrical reference signal.

* * * * *

UNITED STATES PATENT AND TRADEMARK OFFICE
CERTIFICATE OF CORRECTION

PATENT NO. : 4,958,072

DATED : Sep. 18, 1990

INVENTOR(S) : Thomas Hofler, et al.

It is certified that error appears in the above-identified patent and that said Letters Patent is hereby corrected as shown below:

Column 1:line 59:

Change "$\theta=\tan^{-1}[(A/B]^{\frac{1}{2}}$" to

--(1) $\theta=\tan^{-1}[(A/B)]^{\frac{1}{2}}$--.

Column 2:line 10:

Change "$\theta=\tan^{-1}[(A \cdot B_{max}/B \cdot B_{max})^{\frac{1}{2}}]$" to

--$\theta=\tan^{-1}[(A \cdot B_{max}/B \cdot B_{max})^{\frac{1}{2}}]$--.

Column 2:line 15:

Change "$\cos 2\theta = A/A_{max} 31\ B/BHd\ \underline{max}$" to

--$\cos 2\theta = A/A_{max} - B/B_{max}$--.

Column 5:line 52:

Change "$\Omega = \tan^{-1}[-\tan^2\theta]$" to

--(5) $\Omega = \tan^{-1}[(-D\tan^2\theta\sin\phi)/(B+D\tan^2\theta\cos\phi)]$--.

Column 7 line 11:

Change "$\cos_2\theta$" to --$\cos^2\theta$--.

Column 7:line 16:

Change "$=(A+B\sin(wt))\cos^2\theta+(C+D\sin(wt+\phi))\sin^2\theta$" to

--(6) $\Phi=(A+B\sin(wt))\cos^2\theta+(C+D\sin(wt+\phi))\sin^2\theta$--.

UNITED STATES PATENT AND TRADEMARK OFFICE
CERTIFICATE OF CORRECTION

PATENT NO. : 4,958,072

DATED : Sep. 18, 1990

INVENTOR(S) : Thomas Hofler, et al.

It is certified that error appears in the above-identified patent and that said Letters Patent is hereby corrected as shown below:

Column 7:line 43:

Change "$\Omega=\tan^{-1}[(-D\tan^{2\theta\sin\phi}]/B+D\tan^{2\theta\cos\phi})]$" to --(11)   $\Omega=\tan^{-1}[(-D\tan^2\theta\sin\phi)]/(B+D\tan^2\theta\cos\phi)]$--.

Column 7:line 46:

Change "$\Omega=\tan^{31\ 1}[-\tan^2\theta]$" to --$\Omega=\tan^{-1}[-\tan^2\theta]$--.

Column 7:line 22:

Change "$\phi_{ac}=B\sin(wt)\cos^2\theta+D\sin(wt+\phi)\sin^2\theta$" to

--(7)   $\phi_{ac}=B\sin(wt)\cos^2\theta+D\sin(wt+\phi)\sin^2\theta$--.

Column 7:line 26:

Change "$\phi_{ac}=B\sin(wt)\cos^2\theta+D[\sin(wt)\cos\phi+\cos(wt)\sin\phi]\sin^2\theta$" to --(8)   $\phi_{ac}=B\sin(wt)\cos^2\theta+D[\sin(wt)\cos\phi+\cos(wt)\sin\phi]\sin^2\theta$--.

Column 7:line 33:

Change "$0=[B\cos^2\theta+D\sin^2\theta\cos\phi]\sin\Omega+D\sin^2\theta\sin\phi\cos\Omega$" to --(9)   $0=[B\cos^2\theta+D\sin^2\theta\cos\phi]\sin\Omega+D\sin^2\theta\sin\phi\cos\Omega$--.

Column 7:line 37:

Change "$\tan\Omega=[-D\sin^2\theta\sin\phi]/[B\cos^2\theta+D\sin^2\theta\cos\phi]$" to --(10)   "$\tan\Omega=[-D\sin^2\theta\sin\phi]/[B\cos^2\theta+D\sin^2\theta\cos\phi]$--.

UNITED STATES PATENT AND TRADEMARK OFFICE
CERTIFICATE OF CORRECTION

PATENT NO. : 4,958,072

DATED : Sep. 18, 1990

INVENTOR(S) : Thomas Hofler, et al.

It is certified that error appears in the above-identified patent and that said Letters Patent is hereby corrected as shown below:

Column 7:line 47:
Change "106" to --$\Omega$--.

Signed and Sealed this

Twenty-fourth Day of December, 1991

*Attest:*

HARRY F. MANBECK, JR.

*Attesting Officer*     *Commissioner of Patents and Trademarks*